United States Patent Office.

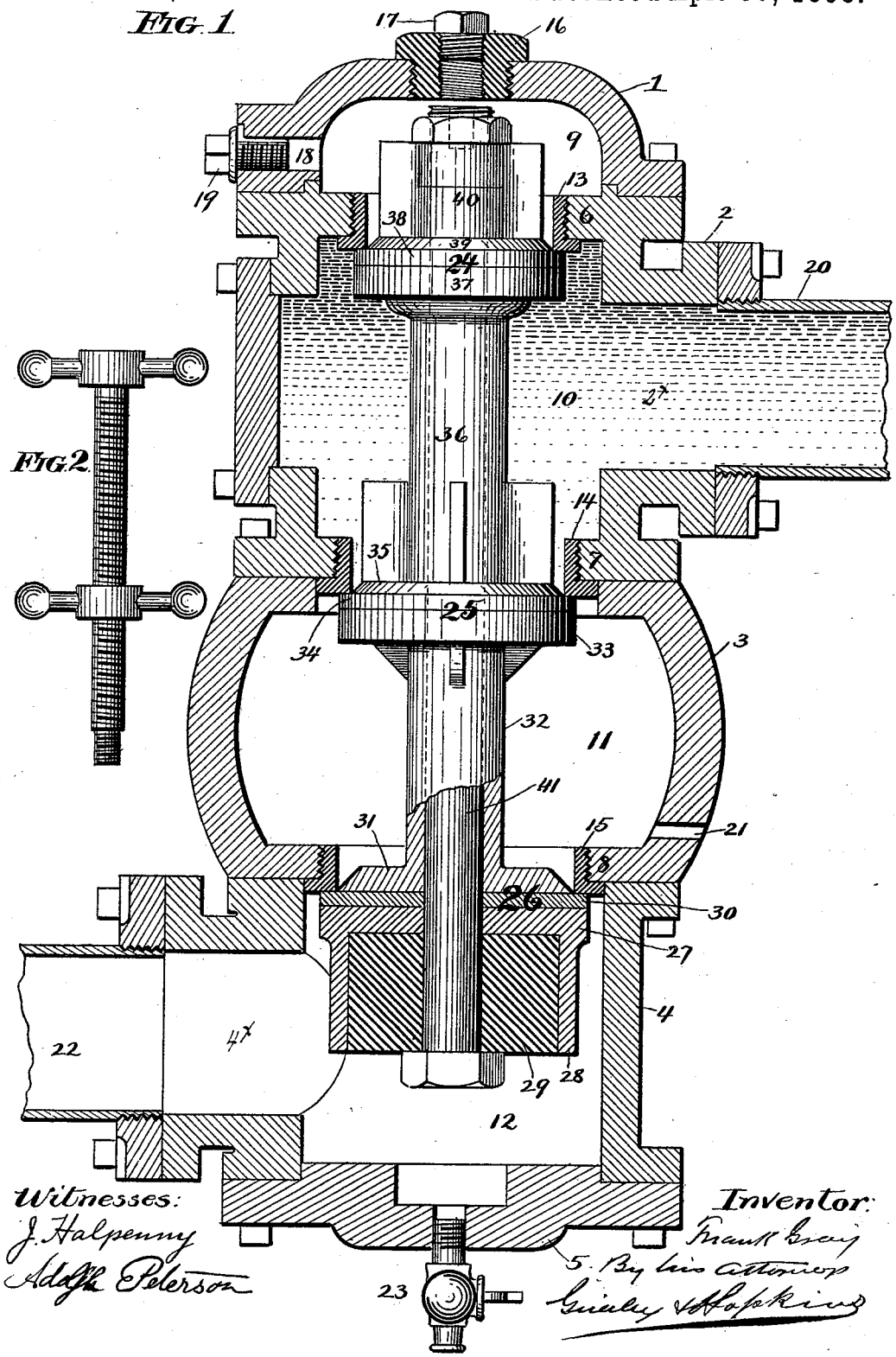

FRANK GRAY, OF CHICAGO, ILLINOIS.

VALVE FOR AUTOMATIC FIRE-EXTINGUISHERS.

SPECIFICATION forming part of Letters Patent No. 538,446, dated April 30, 1895.

Application filed October 29, 1894. Serial No. 527,109. (No model.)

*To all whom it may concern:*

Be it known that I, FRANK GRAY, a citizen of the United States, residing in Chicago, in the county of Cook and State of Illinois, have invented certain new and useful Improvements in Valves for Automatic Fire-Extinguishers, of which the following is a specification.

The subject of the present invention is a valve intended to be used in dry-pipe sprinkler systems for controlling the admission of water to the system. Some features of the invention are applicable, generally, to all valves of this class, while others are applicable only to valves of that species in which the valve proper seats upward and is held seated by the pressure of the air or gas in the system and is unseated by gravity upon a reduction of said pressure.

The principal object of the invention is to provide a valve of this latter description with an outlet for any water (if any) that leaks past the valve and prevent said water from entering the system, the objection to its entering the system being that it will column the valve and prevent its operating upon the fixing of a head.

Another object of the invention is to improve the construction of the valve proper when the latter has a plurality of cut-offs, all connected by a stem. Where there is a plurality of valve seats arranged in line and absolutely fixed with relation to each other, the distance between the faces of the cut-offs must bear a proper relation to the distance between the faces of the valve-seats, else the cut-offs will not seat perfectly.

The invention consists in the features of novelty that are particularly pointed out in the claims, and in order that it may be fully understood I will describe it with reference to the accompanying drawings, which are made a part hereof, and in which—

Figure 1 is a vertical central section of a valve embodying the invention. Fig. 2 is an elevation of an implement used for setting the valve proper.

The casing is constructed of five castings, 1, 2, 3, 4 and 5, each provided with such features as are necessary for the reception of bolts, whereby they are all secured together. It is provided on its interior with three annular shoulders or flanges, 6, 7 and 8, which divide it up into four chambers, 9, 10, 11 and 12. Each of the three shoulders is threaded and into each is screwed a ring (13, 14, 15) and the under side or face of each of these rings is dressed off to form a valve seat, presented downward.

The section 1 of the casing is provided at top with a threaded opening into which is screwed a plug 16, the opening being of sufficient size to admit the hand to the chamber 9. This plug is in turn provided with a centrally located screw-threaded opening which is normally closed by a screw plug 17, but through which may be passed the implement shown in Fig. 2, for the purpose of seating the valve proper in the manner described in Letters Patent No. 513,571, which were granted to me January 30, 1894. This section of the casing has also an opening for draining the chamber 9 of any water that may leak into it, the opening being preferably closed by a plug 19. It is not, however, necessary that these openings into the chamber be closed at all, as it is the intention to maintain atmospheric pressure within said chamber, and if said openings are closed the character of the closures should be such as to permit the passage of air with sufficient freedom to maintain this condition. For example, where a plug is used as a closure it may be so constructed as to permit air to leak past it, and to this end it may have a small groove cut in it as shown at 91. The closures are provided more especially for preventing inquisitive and meddlesome persons from tampering with the valve and for excluding dirt, &c.

The section 2 of the casing is provided with an opening $2^{\times}$ with which the water supply pipe or main 20 communicates.

The section 3 of the casing is provided with a leak hole 21 which may or may not be provided with a valve and which is for the purpose of permitting the escape of any water that may leak into the chamber 11.

I am aware that it is not broadly new to provide a valve of the same general character as the one which forms the subject of the present invention with a chamber located between the water main and the system, and adapted to receive any water that may leak past the valve, said chamber being provided with a drip opening through which said water escapes, and I do not claim, broadly, a valve having such a chamber, this part of my invention being limited to a valve of the species shown in the drawings.

The section 4 of the casing is provided with an opening $4^x$ with which the distributing system communicates, a portion of said system being shown at 22.

The section 5 of the casing is provided with an opening for the purpose of draining the chamber 12 of any water that may accumulate in it, said opening being provided with a petcock 23 by which it is normally closed airtight.

The valve proper comprises three cut-offs, 24, 25 and 26, and a stem by which they are all rigidly connected. It is of course essential that these cut-offs be so spaced that when the valve is elevated, each cut-off shall have a firm bearing upon its appropriate seat, and as the accurate spacing of these cut-offs would involve great difficulty if the entire valve were made of a single piece of metal, I prefer to make it of a number of pieces, substantially as shown.

27 is a perforated disk having on its under side an annular flange 28 resulting in a socket in which fits a perforated block 29 of Jenkins or other composition of a somewhat yielding character. Upon this disk is a perforated disk 30 of Jenkins or other suitable yielding material. This disk 30 is confined between the disk 27 and a second disk 31, the outer edge of which is beveled off to give it a frusto conical shape, the size of the disk 31 being such that its beveled edge will act in conjunction with the valve seat 15 and properly center the cut-off 26. The disk 31 is at the lower end of a tubular stem 32, and at the upper end of this latter is a disk 33, which forms the base of the cut-off 25, its top side being provided with a disk 34 of Jenkins or similar composition, which is secured in place by a disk 35 formed at the lower end of a tubular stem 36, on the upper end of which is a disk 37 that forms the base of the cut-off 24. Upon this disk 37 is arranged a perforated disk 38 of yielding material, which is held in place by a disk 39 on the end of a tubular stem 40, and through the perforations of all these parts is passed a bolt 41 by which they are firmly tied together. The head of the bolt bears upon the yielding block 29 and this allows for irregularities in expansion and contraction, this latter function being performed also by the disks 30, 34 and 38.

The valve herein shown and described operates precisely as does the valve described in the patent above referred to, and hence a further description of it is not necessary.

What I claim as new, and desire to secure by Letters Patent, is—

1. In a valve for automatic fire extinguishers a casing having four chambers, arranged one above another, and three openings through which said chambers communicate, and valve-seats surrounding said openings and presented downward, in combination with a valve having three cutoffs, each located in one of the chambers and adapted to seat upward, so that gravity will tend to unseat the valve, said casing having also an opening through which the water supply pipe communicates with one of said chambers, an opening through which the distributing pipe of the system communicates with another of said chambers, an opening through which another of said chambers is drained and the pressure within it kept low, low pressure being also maintained in the fourth chamber, substantially as set forth.

2. In a valve for automatic fire extinguishers, a casing having three chambers located one above another, said casing having an opening through which the upper chamber may communicate with a region of lower pressure than is normally maintained in the chamber itself, a second opening through which the upper chamber communicates with the intermediate chamber, and a third opening through which the intermediate chamber communicates with the lowest chamber, and valve-seats surrounding said openings and presented downward, in combination with a valve having three cutoffs, one located in each of said chambers and adapted to seat upward, so that gravity will tend to unseat the valve, the casing having also an opening through which the intermediate chamber is drained and kept at atmospheric pressure and openings through which the water pipes communicate with the other two chambers, whereby the pressure within the casing, acting upon the valve, holds it normally seated, substantially as set forth.

3. In a valve for automatic fire extinguishers a casing having three chambers located one above another, the upper chamber having an opening with which the water supply pipe communicates, the intermediate chamber having an opening through which it is drained and kept at atmospheric pressure, and the lower chamber having an opening with which the distributing pipe of the system communicates, the casing having also openings located one above another, through which said chambers communicate, and valveseats surrounding said openings, in combination with a valve having a cut-off located in the lower chamber, a second cut-off located in the intermediate chamber, and a stem connecting said cut-offs, said cut-offs being adapted to seat upward, the valve being so constructed that the pressure of the water against it is practically balanced, whereby it may be held in elevated position (seated) by the pressure of the air in the lower chamber, acting against the cut-off in said chamber and whereby it will be unseated by gravity upon a reduction of said pressure, substantially as set forth.

4. In a valve for automatic fire extinguishers, a casing having four chambers located one above another, the upper chamber having an opening through which it is kept at atmospheric pressure, the second chamber having an opening with which the water supply pipe communicates, the third chamber having an opening through which it is drained and kept at atmospheric pressure, and the fourth and lowest chamber having an opening with which the distributing pipe of the system communicates, the casing having also openings located one above another through which said chambers communicate, and valve seats surrounding said openings and presented downward, in combination with a valve having an upward-seating cut-off located in the fourth chamber and adapted to close the opening between the third and fourth chambers, a second upward-seating cut-off located in the third chamber and adapted to close the opening between the second and third chambers, a third cut-off located in the second chamber and adapted to close the opening between the first and second chambers and a stem connecting said cut-offs, the area of the opening between the second and third chambers being practically equal to the area of the third cut-off, whereby the pressure of the water against the valve is practically balanced and whereby the valve may be held in elevated position (seated) by the pressure of the air in the lower chamber, acting against the cut-off in said chamber, and whereby it will be unseated by gravity upon a reduction of said pressure, substantially as set forth.

5. In a valve for automatic fire extinguishers, the combination with a plurality of seats arranged in line with each other, of a valve proper having the perforated disk 27, the perforated disk 30, of yielding material, the perforated disk 31, the perforated disk 33, the perforated stem 32 spacing the disks 31 and 33, the perforated disk of yielding material 34, the perforated disk 35, and the bolt extending through all of said parts and securing them together.

6. In a valve for automatic fire extinguishers, the combination with a plurality of seats, arranged in line with each other, of a valve proper having a plurality of separately formed cut-offs and a stem uniting them, said cut-offs being formed of perforated disks and the stem being also perforated, a bolt passing through the perforations of said parts and securing them together, and a block of yielding material arranged between the head of the bolt and the end cut-off of the valve, substantially as set forth.

FRANK GRAY.

Witnesses:
   L. M. HOPKINS,
   N. C. GRIDLEY.